United States Patent [19]

Myers et al.

[11] 4,359,160

[45] Nov. 16, 1982

[54] NESTABLE FOAM CUP WITH IMPROVED HEAT RETENTION AND THE PROCESS FOR ITS MANUFACTURE

[75] Inventors: Donald W. Myers; Samantha L. Vivlamore, both of Canandaigua, N.Y.

[73] Assignee: Mobil Oil Corporation, New York, N.Y.

[21] Appl. No.: 212,920

[22] Filed: Dec. 4, 1980

Related U.S. Application Data

[63] Continuation-in-part of Ser. No. 942,836, Sep. 15, 1978, Pat. No. 4,239,727.

[51] Int. Cl.³ ............................................. B29D 27/00
[52] U.S. Cl. ................................ 206/519; 229/1.5 B; 264/53; 264/321; 264/DIG. 13
[58] Field of Search ........... 264/321, 51, 53, DIG. 13; 206/519; 229/1.5 B

[56] References Cited

U.S. PATENT DOCUMENTS

| | | | |
|---|---|---|---|
| 3,260,781 | 7/1966 | Lux et al. | 264/321 |
| 3,338,997 | 8/1967 | Tigner | 264/89 |
| 3,531,555 | 9/1970 | Tiffin et al. | 264/82 |
| 4,189,456 | 2/1980 | Rausing | 264/25 |

Primary Examiner—Philip Anderson
Attorney, Agent, or Firm—Charles A. Huggett; Michael G. Gilman; James P. O'Sullivan, Sr.

[57] ABSTRACT

A thermoformed polymeric foam article, such as a cup or container, is disclosed having improved thermal insulation properties. Contact with hot water causes expansion of the foam wall, substantially decreasing foam density and providing greater heat retention.

17 Claims, 12 Drawing Figures

U.S. Patent Nov. 16, 1982 Sheet 1 of 5 4,359,160
FIG. 1
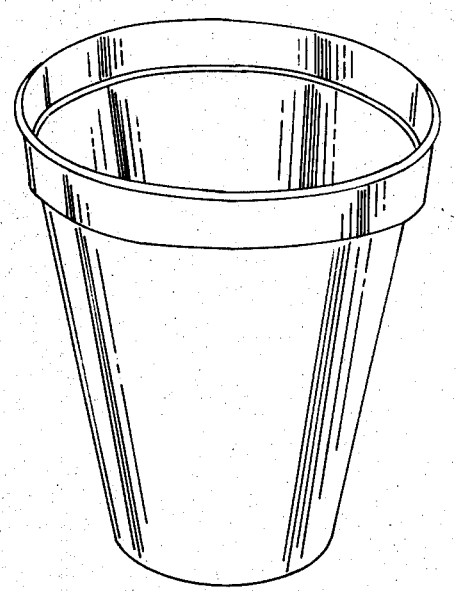
FIG. 2
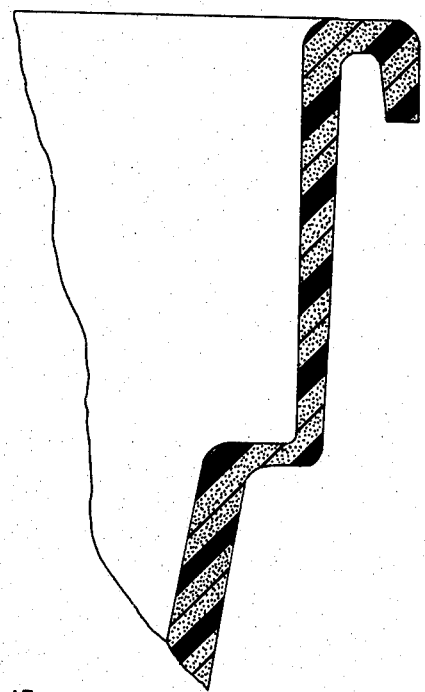
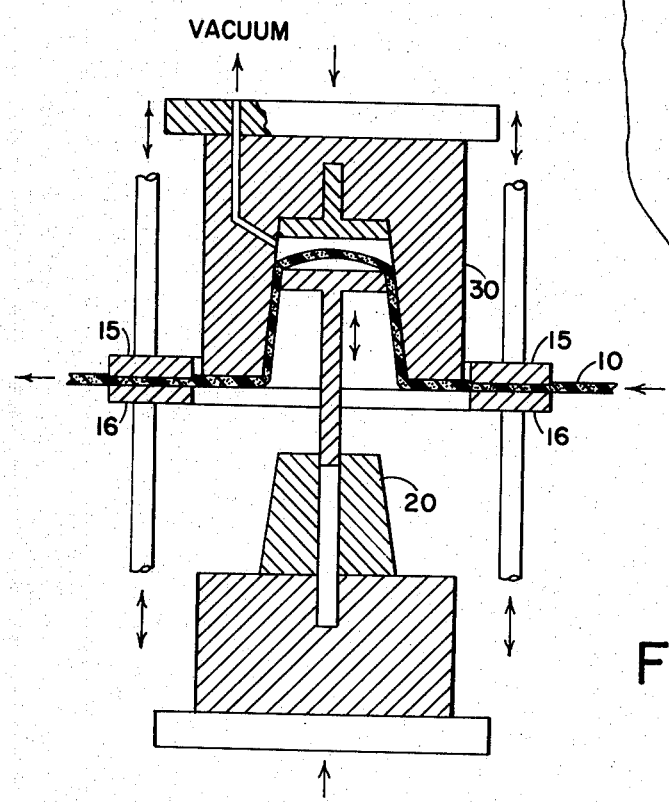
FIG. 3

NESTABLE FOAM CUP WITH IMPROVED HEAT RETENTION AND THE PROCESS FOR ITS MANUFACTURE

CROSS-REFERENCE TO COPENDING APPLICATION

This application is a continuation-in-part of U.S. patent application Ser. No. 942,836 filed Sept. 15, 1978 and now U.S. Pat. No. 4,239,727 issued Dec. 16, 1980 for Method and Apparatus for Thermoforming Thermoplastic Foam Articles, incorporated herein by reference.

BACKGROUND OF THE INVENTION

This invention relates to thermoplastic foam articles, such as drinking cups. In particular, it relates to a novel container structure having improved thermal insulation properties.

Present use of thermoplastic foam cups accounts for many billions of units per year. Foamed polystyrene has been widely employed for hot and cold beverage containers as well as a variety of other uses. Small hand-held tumblers or cups are inexpensive, disposable items commonly supplied as a stack of nestable containers. One product which has found widespread commercial acceptance is the bead-formed polystyrene cup, which is made by introducing a quantity of foamable resin beads containing a thermally activated blowing agent and injecting high temperature steam to cause expansion of the beads inside a cup-shaped mold. Another commercial foam product is fabricated from thermoplastic foam sheet.

In U.S. Pat. No. 3,260,781 (Lux et al) a thermoforming method is disclosed for making a hot cup from thermoplastic foam sheet utilizing plug assist and vacuum molding techniques in combination with compression molding to obtain a cup having low heat distortion. In copending U.S. patent application Ser. No. 942,836, an improved thermoforming technique is disclosed for deep drawing low density thermoplastic sheet with a time-delayed plug-assisted forming step which results in a unique cup structure. Heat retention ability is an important criteria for successful foam hot cups for use with hot liquids. A successful foam hot cup when filled with hot aqueous liquid at the time of use, will maintain that liquid hot for a sufficient period of time. Heat retention is measured by filling a cup with boiling water (100° C.) and measuring the decrease in water temperature versus time. Improving heat retention ability results in maintaining a hot liquid in a cup at a higher temperature at any given time after initial filling.

SUMMARY OF THE INVENTION

It has been discovered that heat retention ability can be improved in foam cups by increasing the cup wall thickness with the addition of a hot liquid at the time of use. This growth in thickness decreases the heat transfer rate through the cup walls, thus improving the cup's heat retention ability. The amount of wall growth is dependent upon the temperature to which it is subjected and heating time. In its ordinary use as a hot beverage container, the initial beverage temperature determines the amount of wall growth and, therefore, the ultimate heat retention.

It is a primary object of this invention to provide a thermoplastic foam container consisting essentially of oriented styrenic polymer and having a deep drawn wall of polymer foam containing flat elongated gas-containing cells uniformly distributed through the wall. The preferred foam material includes stretch-oriented styrenic polymer having a Vicat softening point greater than 100° C. (ASTM D1525-Rate "B") and this foam is capable of undergoing substantial growth in wall thickness by heating the container to a temperature less than 100° C.

It is another object to provide a foam container wherein the container wall has improved crush resistance as compared to bead-formed polystyrene.

Yet another object of the invention is to provide a nestable thermoformed styrenic polymer foam article comprising a thermally-expandable foam which expands in thickness at least 10% upon contact with hot fluid at 82° C. to provide improved heat retention wherein the foam comprises closed gas cells and an oriented polymer matrix.

These and other objects and features of the invention will be seen in the specification and the drawing.

THE DRAWING

FIG. 1 is a perspective view of a typical thermoplastic cup according to the present invention;

FIG. 2 is a partial cross-sectional view of the mold gap in the lip portion of the cup;

FIG. 3 is a schematic representation of a preferred thermoforming system employed in production of the cup;

DESCRIPTION OF PREFERRED EMBODIMENTS

Figure 5:
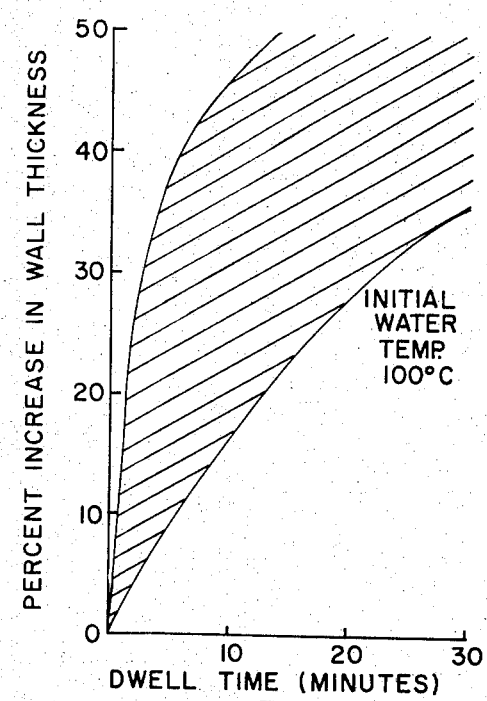
FIG. 5 is a graphic plot of wall thickness increase versus time for the novel container.

In order to obtain the desired effects during use, careful consideration should be given to all materials employed in the cup. While a suitable stock material for the thermoforming procedure may be made with other techniques and materials, hot extruded styrenic polymer with a volatile liquid or gaseous blowing agent is preferred. Unless otherwise stated, the polymeric material used herein consists essentially of amorphous styrene homopolymer having a melt flow rate of about 0.5 to 5 gms/10 minutes (ASTM D1238-Condition "G") and a Vicat softening point greater than 100° C. (ASTM D1525-Rate "B"). Other thermoplastic materials or blends may be employed, particularly paramethyl styrene homopolymer or copolymer with styrene or other ethylenically-unsaturated comonomers in minor amounts.

Thermoplastic foam sheet useful for a starting material can be made by a variety of techniques. Continuous extrusion of molten polystyrene from a slit ring orifice and biaxial stretching of the cooling foam is shown and described in U.S. Pat. No. 4,049,768 to Luthra, incorporated herein by reference. The resin containing a blowing agent develops an internal cell structure, while external cooling provides inner and outer skin surfaces.

By pulling the tubular foam over a forming drum, the foam is biaxially oriented. Slitting the tubular extrusion longitudinally produces a continuous sheet of foam. During the extruder mixing and heating operation, the resin becomes plasticized by the volatile aliphatic alkane blowing agent. After release of the hot resin mass from the pressurized extrusion zone into ambient, volatility of the blowing agent forms a polymeric matrix with closed, spheroidal cells. With immediate stretching of the hot foam during cooling by pulling the tubular foam or web material over a mandrel or between differential rolls, etc., a biaxial orientation is set. The dense skin may be formed on inner and outer foam surfaces by forcing cool fluid in contact with the emerging foam in a known manner. The recovered foam sheet of predetermined thickness, density and composition is permitted to stand in contact with air or other inert gas for sufficient time to partially exchange the volatile hydrocarbon for the outside gas. Thus, the sheet can consist of the polymer, blowing agent and non-volatile additives, such as nucleating agents, anti-oxidants, dyes, minor amounts of pigments and fillers, stabilizers, etc., in non-deleterious amount.

In a preferred embodiment, polystyrene resin containing about 3 to 5 wt. % of pentane blowing agent and a nucleating agent is extruded into a foam sheet, cooled and aged, permitting pentane to migrate out and air or other inert gas to penetrate the foam cellular structure so that about 2-4 wt. % of pentane blowing agent remains in the cellular structure. At this point the average foam stock specific gravity may be about 0.16 to 0.2 (10 to 12 pounds per cubic foot). The actual skin density is essentially that of the resin. This sheet material has significant orientation and slightly flattened gas cells due to stretching during the extrusion process.

Reheating the thermoplastic foam sheet prior to thermoforming can permit a certain amount of deorientation or relaxation of the polymer. This, along with the increase in internal cell pressure, permits the flattened cells to assume a more rounded shape, especially if no restraint is placed on the structure other than that of the chain rails which support the sheet edges during movement through the thermoformer.

In a foam material, orientation is more complex than in a single phase polymer system. In addition to the orientation of the polymer molecules, orientation of the foam structure must be considered. Although it is common to separate the two types of orientation for discussion purposes, it should be noted that they are interrelated.

The primary orientation effect of concern in the foam cup is the orientation of the foam structure. During the thermoforming process to produce foam cups, the cells along the cup's sidewall are stretched to an elongated "pancake" shape. This results in a high surface area to volume ratio. This effect is particularly apparent in those articles, such as tumblers, which have a depth to width ratio of more than 1:1. This elongated cell structure is stable as long as the internal and external forces on the cells are in balance.

When a hot liquid is added to the cup, two changes take place which cause an increase in the thickness of the foam system (thickness being defined as the direction perpendicular to the major plane of the "pancake" shaped cells). The polymer continuous phase, being amorphous in nature, softens, allowing a coincident increase in cell pressure (a result of the rise in temperature of the enclosed gas) to change the shape of each individual cell. Each cell will change in shape until the internal pressure of the cell is in balance with the constraining force applied by the cell wall, atmospheric pressure and any other external forces. Since atmospheric pressure is relatively constant during this time period and the constraining force applied by the cell wall is reduced as a result of the material softening, the result is a reduction in the surface area to volume ratio. If only one cell was involved, this cell would become spherical. However, the foam cup consists of a two phase system in which the cell wall is actually the continuous phase of the system, and therefore, a truly spherical shape cannot be achieved.

In cups manufactured by other techniques, such as the bead forming or similar prior cup processes, the foam cell structure consists generally of spherical shaped cells. When a hot liquid is added to cups of this type, the cells do increase in size due to the increase in internal cell pressure; however, because the cells were already at their optimum shape this increase in cell size and therefore cup wall thickness is not significant.

EXAMPLE A

A 235 ml (about eight ounces) capacity tumbler as shown in FIGS. 1 and 2 was thermoformed by uniformly deep drawing preheated thermoplastic foam sheet thereby flattening and elongating the foam cells to a "pancake" shape. The starting material contained polystyrene (Dow "Styron 685D"), a general purpose homopolymer having a Vicat softening point of 108° C., a melt flow index of 1.6 gms/10 minutes and specific gravity of 1.04 (65 pounds/ft$^3$). The resin is mixed with sodium bicarbonate and citric acid nucleating agents and melted in a hot extruder. To this mixture is added about 3-4 wt. % isopentane blowing agent. A thermoplastic double-skinned sheet is hot extruded (e.g., about 150° C.) and aged in air under ambient conditions to provide an average specific gravity of about 0.16 to 0.2 and substantially uniform thickness of about 2 to 2.3 mm (80 to 90 mils).

Referring to FIG. 3, the thermoforming apparatus is shown schematically in vertical cross-section, with a sheet of thermoplastic foam (preheated to about 115° C. to 140° C.) being indexed forward and clamped between opposing ring clamp members 15, 16, which constrain a predetermined portion of the stock material during the forming steps. A lower male molding member 20 has a separable plug member which stretches the thermoplastic foam 10 partially into a female mold member 30, deforming the sheet and further stretching it as the female mold member closes. After a short dwell period of about 0.1 to 2 seconds, (preferably 0.4 to 1 second), vacuum or a pressure differential is employed, moving the sheet off the plug member into the female cavity; simultaneously the male mold member 20 closes into the female mold member to set the cup at a predetermined fairly uniform thickness, preferably about 1.2 mm in the wall portion. Both the female and male mold members are maintained at a temperature of from about 25° C. to 80° C. Thereafter, the molds and clamping members are released and the sheet is indexed forward to position the succeeding portion of the sheet or web 10 for forming. The formed cup is then trimmed or punched from the sheet and may be packed in nested arrangement to conserve space.

The cup or tumbler product (hereinafter Cup A) has a fairly uniform sidewall and bottom thickness of about 1-1.5 mm (40 to 60 mils) and an average specific gravity of about 0.08 (4.5 to 5.5 pounds/ft³). Preferably, the deep drawn article has a depth to width ratio greater than 1:1. In particular, Cup A is about 91 to 93 mm (3.6 to 3.65 inches) in height, with an outer top diameter of about 80 to 82 mm (3.17 to 3.22 inches) and an inner diameter of about 74 to 76 mm (2.94 to 2.99 inches). The general frusto-conical shape is achieved with a 9° sidewall angle and an outer bottom diameter of about 46 to 48 mm (1.83 to 1.88 inches) and an inner diameter of about 45 to 46 mm (1.77 to 1.82 inches). This configuration is substantially similar to existing standard foam cup products. The tumbler is provided with a recessed portion adjacent the lip for stacking the nested articles in spaced relationship without binding. It is understood that the lip and other details of the container design may be altered considerably within the inventive concept.

Advantageously, the container prior to thermal deformation has an average specific gravity of less than 0.15, preferably about 0.05 to 0.1, and the wall growth with 82° C. contained fluid exceeds 10% of thickness. The nestable foam cup product at this stage consists essentially of oriented styrene homopolymer having a Vicat softening point greater than 100° C. and flattened gas-containing foam cells.

A series of experiments was conducted to compare the novel thermoformed structure with commercially available products. For purposes of comparison, standard frusto-conical 235 ml (about eight ounces) capacity cups were chosen for evaluation. Cup A corresponds to the present invention and has a fairly uniform sidewall and bottom thickness of about 1 to 1.5 mm (40 to 60 mils) and an average sidewall density of about 0.08 g/cc. Cup B is a bead-formed polystyrene "Solo" cup manufactured by Solo Cup Co. Cup C is a "Trophy Cup" manufactured by Lily Division of Owens-Illinois Corp. from thermoplastic sheet fabricated to shape. Cup D is a standard "Dixie" paper hot cup made by American Can Co. These cups had the same general configuration.

Figure 4:
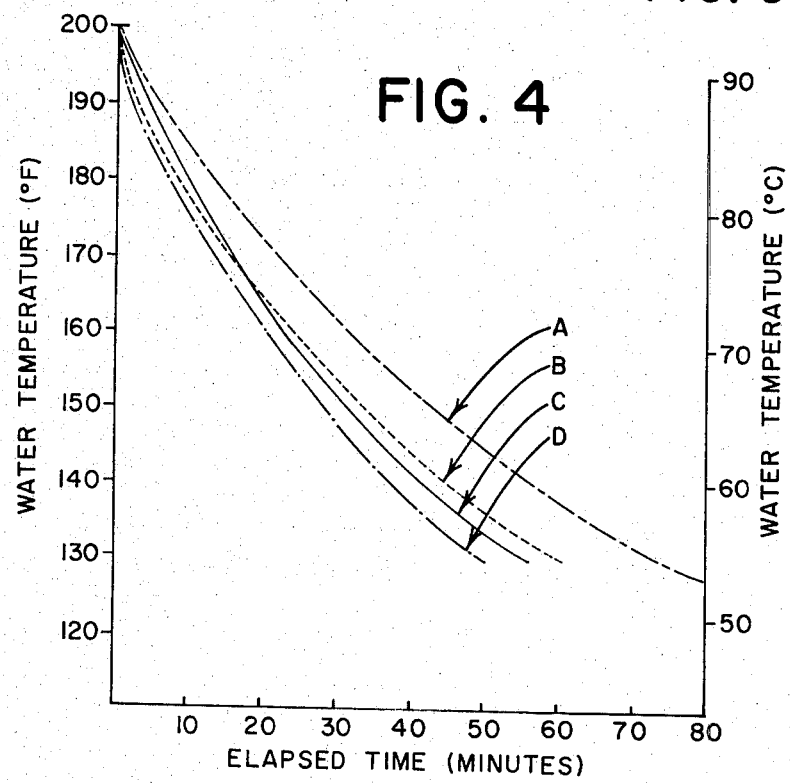
FIG. 4 is a graphic plot of temperature versus time for comparing cooling rates of several containers.

Heat retention ability of these cups was measured according to a standardized procedure in which the product was filled with 205 ml (about seven ounces) of boiling water (100° C.). The open-top cups were then closed by capping them with a standard plastic hot drink cap to prevent evaporative cooling. Temperature versus elapsed time curves for the four cups are shown in FIG. 4. These data clearly show the superior heat retention capacity of new Cup A. The time required for a covered cup to decrease from 93° C. (200° F.) to 54° C. (130° F.) varied from 50 minutes to 74 minutes, with Cup A taking almost 25% longer than the bead cap to reach the lower temperature.

Wall thickness and density measurements were made on the three different types of polystyrene foam cups for various water temperatures (82° C. to 100° C.) and heating times (5 to 30 minutes). Tables 1 and 2 show the changes in sidewall measurements, which data are plotted in FIGS. 5 and 6 to show the trend for variations in initial water temperature and heating (dwell) time.

TABLE 1

SIDEWALL THICKNESS % GROWTH VS. WATER TEMPERATURE
30 Minute Dwell Time at Ambient Temperature

| | INITIAL WALL DENSITY g/cc | PERCENT INCREASE INITIAL WATER TEMP. (°C.) | | | | FINAL WALL DENSITY g/cc 100° C. |
|---|---|---|---|---|---|---|
| | | 82 | 88 | 93 | 100 | |
| CUP A | .08 | 17.4% | 25.2% | 38.4% | 49.3% | 0.053 |
| CUP B | .06 | 0 | 0 | 0 | 2.2% | 0.06 |
| CUP C | .10 | 0 | 0 | 1.1% | 2.3% | 0.10 |

TABLE 2

SIDEWALL THICKNESS % GROWTH VS. DWELL TIME
for 100° C. Initial Water Temperature

| | PERCENT INCREASE DWELL TIME (MINUTES) | | | | | |
|---|---|---|---|---|---|---|
| | 5 | 10 | 15 | 20 | 25 | 30 |
| CUP A | 29.7% | 38.0% | 38.0% | 38.0% | 41.0% | 49.3% |
| CUP B | 1.5% | 1.5% | 4.3% | 2.9% | 1.4% | 2.2% |
| CUP C | 0 | 0 | 0 | 2.3% | 0 | 2.3% |

Figure 6:
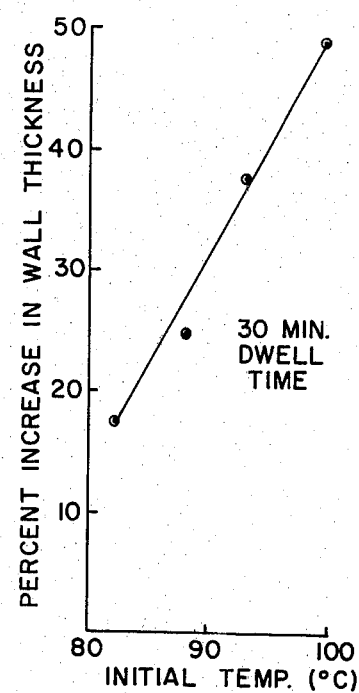
FIG. 6 is a linear plot of wall thickness growth versus contained liquid temperature as a parameter of FIG. 5.

The shaded area in FIG. 5 shows the typical wall thickness increase versus dwell time for a thermoplastic foam cup according to the present invention, wherein initially boiling water (100° C.) is introduced to the cup and permitted to stand. FIG. 6 shows the substantially linear increase of wall thickness with initial water temperature varying from 82° C. to 100° C. at a 30 minute dwell time, for the novel cup.

To demonstrate the differences between deep drawn thermoformed, bead-formed and fabricated foam sheet, the walls of Cup A, B and C, respectively, are shown under magnification in FIGS. 7, 8 and 9. This series of scanning electron micrographs was prepared showing these three different foam cell structures before and after heating with boiling water (100° C.) in the comparative tests. These micrographs are equally magnified approximately 100 times. The photographs represent a central sidewall portion less than one mm thick viewed as a cross section perpendicular to the major axis of each type cup.

Figure 7A:
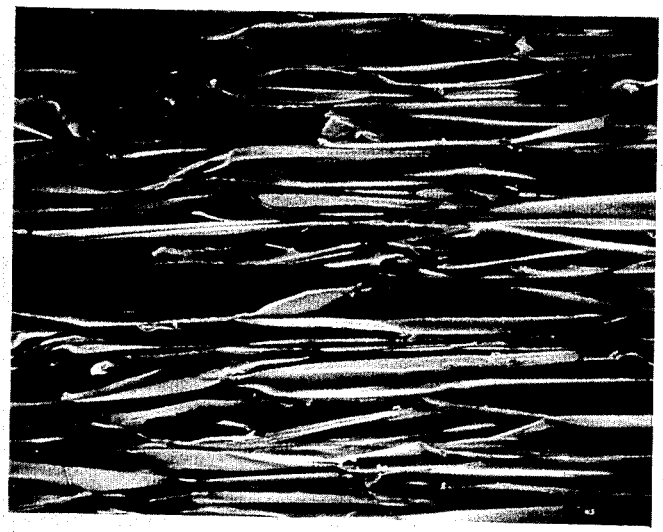
FIGS. 7A & 7B are photographs of magnified foam wall cross-sections before and after thermal expansion.
Figure 7B:
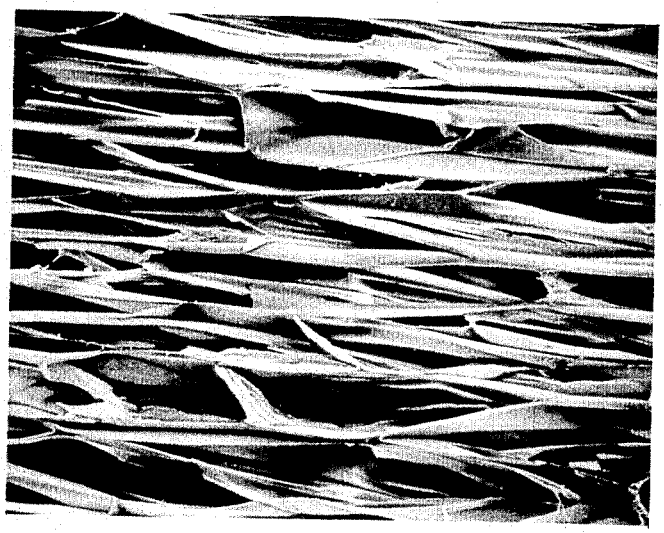

FIG. 7A shows the novel low density foam having elongated "pancake"-shaped cells interleaved and generally parallel to the codirectional wall surfaces. FIG. 7B shows the same foam cell structure after heating in contact with 100° C. water. Increased internal cell pressure and softening of the cell wall material causes the cells to assume a more spherical configuration, which can be related to the overall wall thickness growth.

Figure 8A:
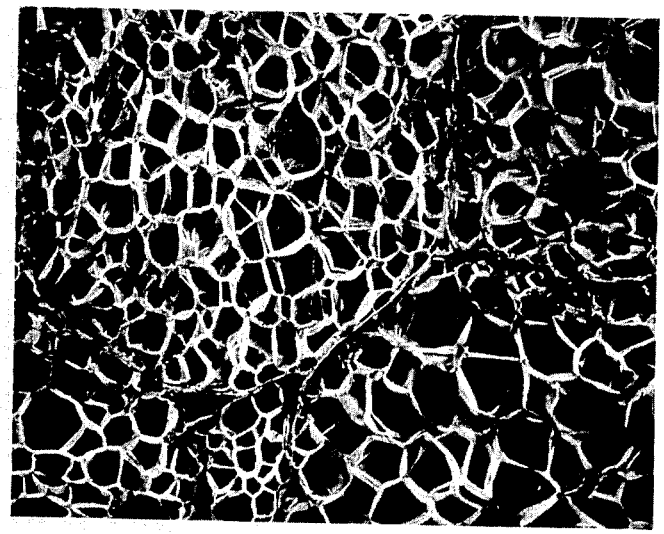
FIGS. 8A & 8B and 9A & 9B are similar photographic magnifications of prior art foam materials before and after heating.
Figure 8B:
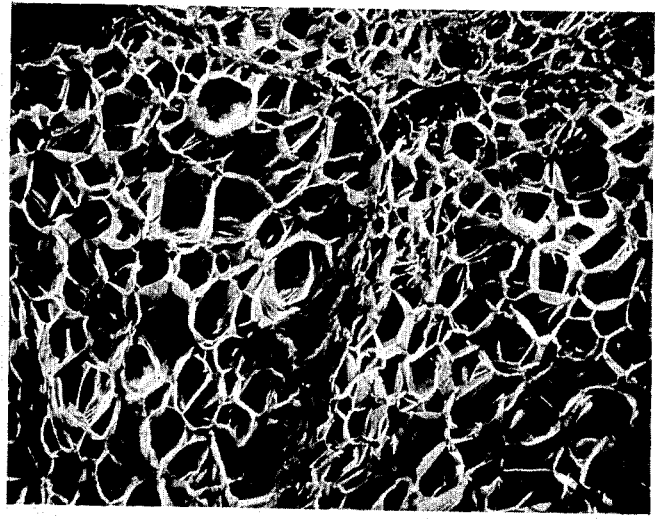
Figure 9A:
Figure 9B:
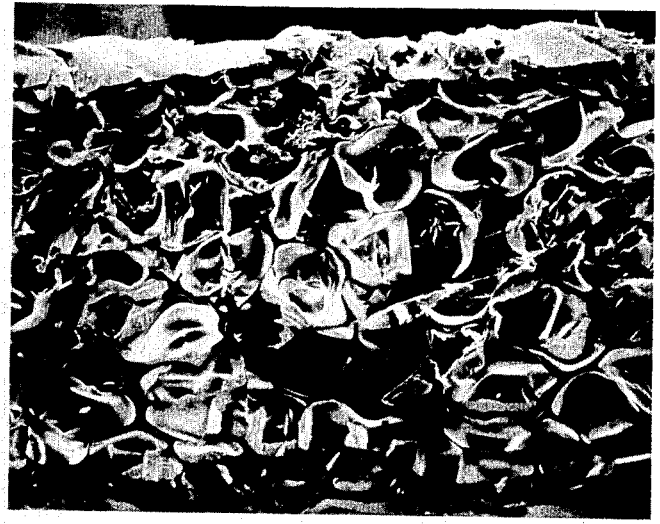

FIGS. 8A and 8B are micrographs of the bead-formed cup before and after filling with boiling water, respectively. The generally spheroidal shape of the cells does not change appreciably during heating. The prior art fabricated foam sheet cup shown in FIGS. 9A and 9B before and after filling has an appearance similar to the bead foam product.

Wall growth observed in the new thermoformed cups with the addition of a hot liquid at the time of use is important because it enables the manufacture of a foam cup with a thinner wall. Wall thickness relates to cup stack height and shipping volume. The thinner wall foam cup allows for a smaller case cube and lower shipping costs, which can be a substantial part of the total consumer cost.

Certain thermoformed foam articles according to this invention are sufficient to provide markedly increased cell flattening and decreased average foam density, while retaining cell and skin integrity in the final satin-surfaced product. Smoothness and continuity of the thermoformed walls are easily distinguishable features of the present invention, contributing to the improved thermal performance and physical characteristics. Another significant advantage of thermoformed articles according to the present invention is crush resistance. The sidewall cell structure having elongated flattened cells coupled with the sidewall's low overall density is quite strong and flexible, especially as compared with a typical bead-formed cup. This can be demonstrated by hand squeezing the cups of comparable size and weight. The new cups can be collapsed without rupturing the walls thereof and unfolded for reuse; whereas a typical bead cup or the like is easily broken and distinguished by hand, rendering it useless.

While the invention has been disclosed in certain preferred embodiments, variations and modifications will be apparent to one skilled in the art. The inventive concept should not be limited except as set forth in the following claims.

We claim:

1. A thermoplastic foam container consisting essentially of oriented styrenic polymer having a deep drawn wall of polymer foam, said foam characterized by containing flat, elongated, pancake-shaped, interleaved, gas-containing cells, uniformly distributed generally parallel to the codirectional wall surfaces; said styrenic polymer having a Vicat softening point of at least 100° C.; said wall further characterized by having an average specific gravity of less than 0.15 prior to any thermally caused increase in wall thickness; and said container capable of undergoing an excess of 10% increase in wall thickness when subjected to a temperature between about 82° C. and about 100° C.

2. The container of claim 1 wherein the styrenic polymer consists essentially of paramethyl styrene polymer.

3. A container according to claim 1 having a wall thickness increase for contained 100° C. water substantially within the shaded area of the dwell time-percent increase plot of FIG. 5.

4. The container of claim 1 wherein the foam stock material from which the container is deep drawn has an average specific gravity of from about 0.16 to about 0.20.

5. The container of claim 4 having a generally frustro-conical nestable shape with depth exceeding width and substantially uniform wall thickness.

6. The container of claim 3 wherein the container wall has improved crush resistance as compared to bead-formed polystyrene.

7. A nestable thermofoamed styrenic polymer foam cup comprising a thermally-expandable foam which expands in thickness at least 10% upon contact with hot fluid at between about 82° C. to about 100° C. for a predetermined dwell time to provide improved heat retention; the foam structure comprising flat, elongated, pancake-shaped, interleaved, gas-containing cells, uniformly distributed generally parallel to the codirectional wall surfaces of the cup wall.

8. A nestable foam cup according to claim 7 wherein the foam comprises oriented styrene homopolymer having a Vicat softening point greater than 100° C.

9. A nestable foam cup according to claim 8 wherein the cup is thermoformed by uniformly deep drawing a pre-heated thermoplastic foam sheet having an average specific gravity of from about 0.16 to about 0.20 thereby forming said foam structure.

10. A nestable foam cup according to claim 9 wherein the styrenic foam is biaxially oriented during deep drawing to produce a low density cup.

11. In a thermoformed polymeric foam article with substantially uniform wall thickness comprising linear styrenic polymer having a thermal expansion capacity, the improvement which comprises:
  a cellular foam wall comprising a polymeric matrix and closed gas cells dispersed therein, the cells of the cellular foam wall comprising flat, elongated, pancake-shaped, interleaved, gas-containing cells, uniformly distributed generally parallel to the codirectional wall surfaces of the article wall; and
  the polymeric matrix having significant stretch orientation.

12. A thermoformed foam article according to claim 11 wherein the elongated and flattened cell configuration is induced by thermoforming pre-oriented thermoplastic foam sheet.

13. A thermoformed foam article according to claim 11 where said foam has an average specific gravity of less than 0.15.

14. A method for obtaining improved heat retention in hot cup-containers comprising the steps of:
  providing a thermoplastic foam container consisting essentially of oriented styrenic polymer having a deep drawn wall of low-density polymer foam containing flat, elongated, gas-containing cells, uniformly distributed through the wall, said styrenic polymer having a Vicat softening point greater than 100° C., wherein said container prior to thermal deformation has an average density of less than 0.15 grams/cc;
  contacting the container with fluid at a temperature in the range of about 82° C. to 100° C.; and
  permitting a wall growth in excess of 10% of thickness.

15. The method of claim 14 wherein the container is made by hot extruding a foam sheet from an extrusion mass containing molten polymer and alkane blowing agent, biaxially orienting the extruded foam sheet, aging the foam sheet to obtain a thermoformable sheet stock material consisting essentially of a polymeric matrix and closed gas cells;
  preheating the thermoplastic foam sheet stock;
  clamping the preheated stock material between cooled male and female molds;
  partially deforming the preheated sheet stock toward the female mold by extending a plug member from the male mold; and
  completely forming the container by drawing the partially formed preheated sheet stock and closing the male and female molds.

16. The method of claim 15 wherein a plug member deforms the preheated sheet stock with a dwell period of about 0.4 to one second before employing a vacuum or pressure differential.

17. The method of claim 14 wherein the container wall displays essentially linear growth substantially as shown in FIG. 6.

* * * * *